United States Patent [19]

Peruglia et al.

[11] 3,792,909
[45] Feb. 19, 1974

[54] ANTI-SKID BRAKING SYSTEM

[75] Inventors: Marco Peruglia; Giancarlo Michellone, both of Cambiano, Turin, Italy

[73] Assignee: Fiat Societa per Azioni, Turin, Italy

[22] Filed: June 12, 1972

[21] Appl. No.: 261,759

[30] Foreign Application Priority Data
June 14, 1971  Italy.................................. 69018/71

[52] U.S. Cl..................... 303/21 F, 251/30, 303/68
[51] Int. Cl............................................. B60t 15/04
[58] Field of Search.. 188/181; 251/25, 30, 61, 61.5, 251/62, 120; 303/66, 21 F, 68–69

[56] References Cited
UNITED STATES PATENTS

| 3,411,835 | 11/1968 | Davis................................. 303/21 F |
| 3,602,554 | 8/1971 | Ichimura et al. ............... 303/21 F X |
| 3,682,514 | 8/1972 | Oberthur........................... 303/21 F |
| 3,704,047 | 11/1972 | Yarber........................... 303/21 F X |

*Primary Examiner*—Duane A. Reger
*Assistant Examiner*—Stephen G. Kunin
*Attorney, Agent, or Firm*—Sughrue, Rothwell, Mion, Zinn & Macpeak

[57] ABSTRACT

An hydraulic distributor for an anti-skid braking system which can be connected into existing braking systems is disclosed. The distributor comprises a body having an input orifice for connection to the master cylinder of the braking system, and outlet orifice for connection to the brake actuators of the system, a discharge orifice for connection to the reservoir of the system and an electrical control input for connection to output of an electronic anti-skid control device which provides an electrical signal when the wheels of the vehicle are in danger of skidding. The distributor includes a solenoid operated valve which normally connects the input orifice to the output orifice but which connects the output orifice to the discharge orifice when a signal through the anti-skid control arrangement is received. The distributor has two modes of operation depending on the braking pressure at the time the anti-skid control device operates, which in turn indicates whether the vehicle is on dry ground or on wet or slipping ground so that satisfactory anti-skid action is obtained in both cases.

4 Claims, 5 Drawing Figures

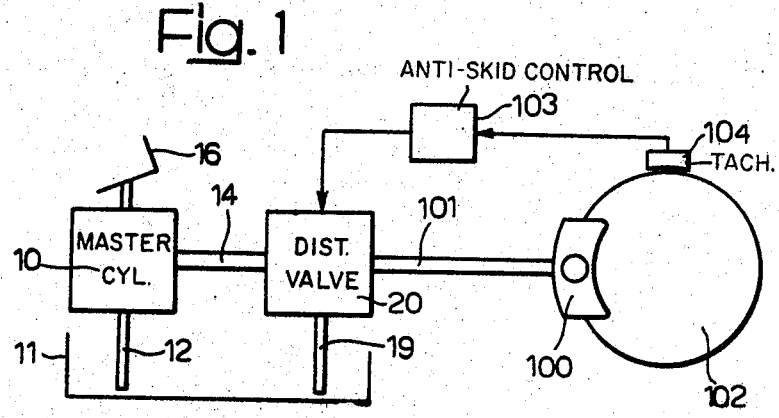
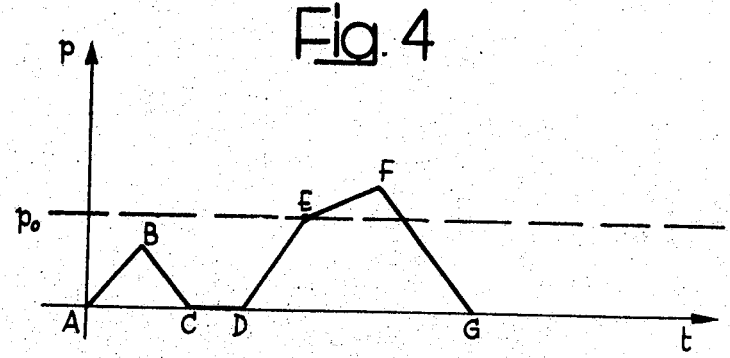
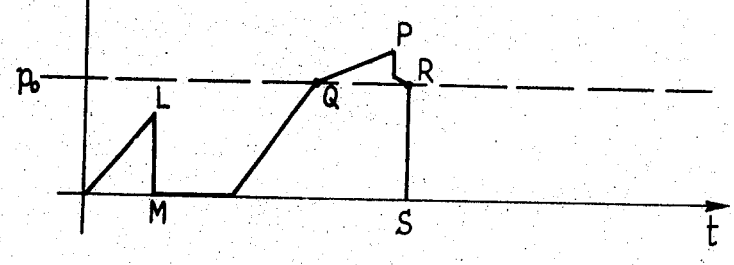

з,792,909

ANTI-SKID BRAKING SYSTEM

BACKGROUND OF THE INVENTION

The present invention relates to motor vehicle anti-skid braking systems, and particularly to an hydraulic distributor of particularly compact and efficient type for use in such anti-skid braking systems.

Hydraulic anti-skid braking systems for the wheels of a motor vehicle are known as such. One such known system comprises separate hydraulic distributor devices which are connected by conduits in such manner as to provide two modes of operation of the braking system in dependence on the degree of adhesion of the vehicle wheels on the ground over which the vehicle is moving so that satisfactory behaviour of the braking system over different types of ground is obtained, avoiding undue jerkiness on dry ground while at the same time having sufficient sensitivity for wet and slippery ground.

The arrangement of the prior art, however, comprises numerous valves requiring a large number of connecting conduits, and various absorbers and other components, and so is complicated and bulky, and moreover requires a long time for assembly thereby making it expensive. In addition the structure is exposed to wear and tear and thus liable to be readily damaged.

OBJECTS OF THE INVENTION

One object of the present invention is to provide an hydraulic distributor arrangement which is capable of operating in one of two modes in dependence on the road conditions, which is relatively small, and which is readily connectable into a braking system so that the required installation time is short and thus manufacturing costs are reduced.

Another object of this invention is to provide an hydraulic anti-skid distributor arrangement that can be readily installed into existing braking systems which are not provided with an anti-skid arrangement.

SUMMARY OF THE INVENTION

According, therefore, to the present invention, there is provided an hydraulic distributor for an anti-skid braking system of a motor vehicle, having an inlet orifice for connection to a source of fluid under pressure, an outlet orifice for connection to a wheel brake, a discharge orifice for connection to a fluid reservoir, and a control input for connection to an anti-skid control device which is operable, when the braked wheel is in an incipient locking condition to provide a signal to the control input of the distributor, characterised in that the distributor comprises a piston biased in one direction along a cylinder by a calibrated spring to a first position and movable to a second position when the braking pressure exceeds the calibration threshold of the said spring, a chamber communicating with the said discharge orifice, a valve shutter movable by a biasing spring to close the communication between the said chamber and the discharge orifice and held in a position to allow the said communication by the piston when in its first position, first valve means controlled by a solenoid, connected to the control input, and normally allowing communication between the inlet orifice, the outlet orifice and the cylinder within which is slidable the piston, and operable to interrupt the said communications and to establish communication between the outlet orifice and the said chamber upon energisation of the solenoid, an absorber arrangement in direct communication with the said chamber and in throttled communication with the discharge orifice, second valve means controlled by a solenoid connected to the control input, normally allowing a direct communication between the chamber and the discharge orifice and operable to prevent such communication upon energisation of the solenoid.

Various other features and advantages of the invention will become apparent during the course of the following description with reference to the accompanying drawings which is given purely by way of non-restrictive example.

BRIEF DESCRIPTION OF THE DRAWINGS

FIG. 1 is a general diagrammatic representation of an anti-skid braking system;

FIGS. 4 and 5 illustrate the variation of the braking pressure of the system shown in FIG. 1 as a function of time, illustrating a few typical cases.

DESCRIPTION OF THE PREFERRED EMBODIMENTS

Figure 2:
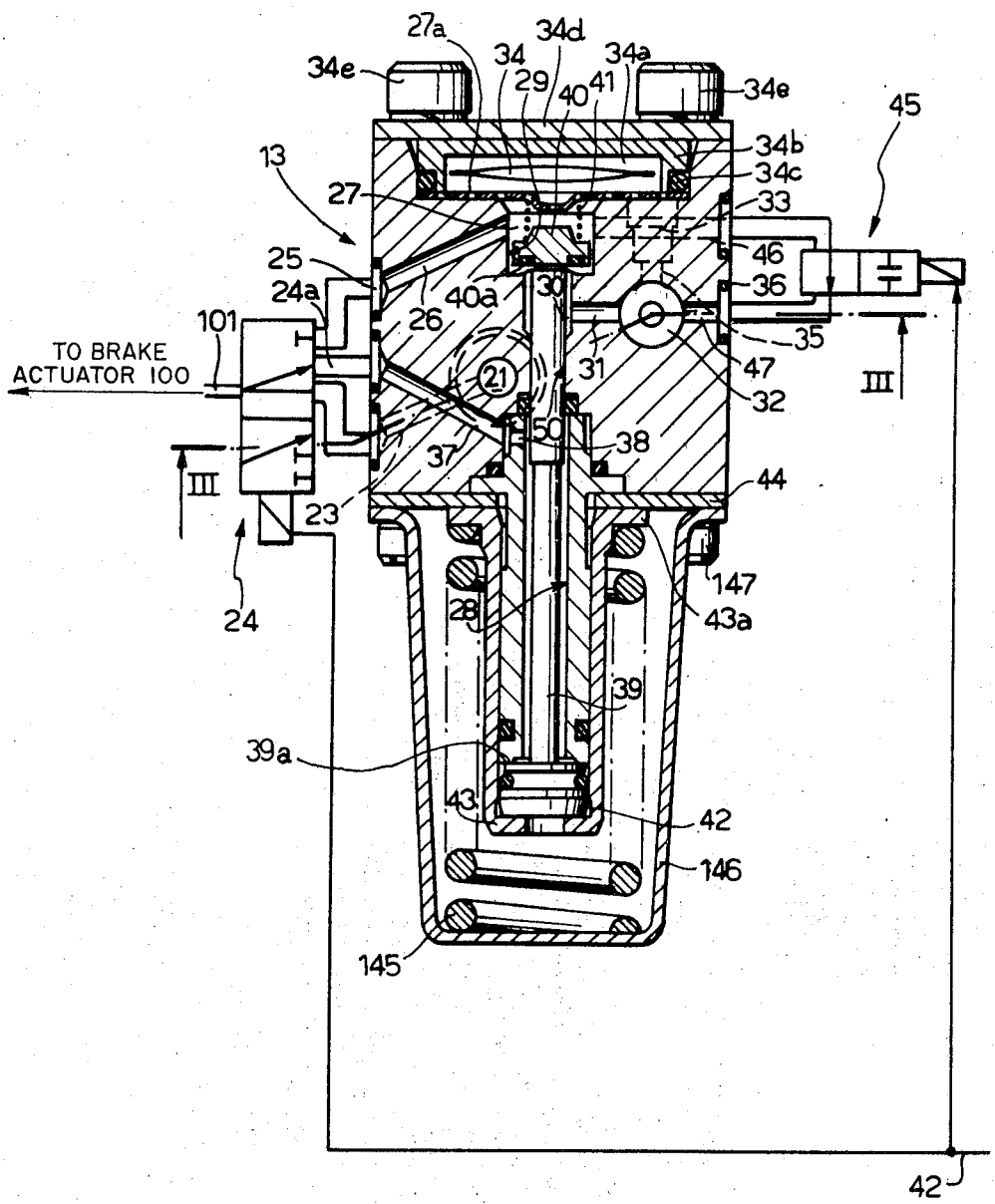
FIG. 2 is a partially diagrammatic, partially axial sectional view of an anti-skid hydraulic actuator formed as an embodiment of this invention.

Referring now to the drawings there is shown a source 10 of fluid under pressure capable of drawing fluid from a reservoir 11 through a conduit 12 and passing it along a conduit 14 under the control of a pedal 16 operation of which controls the pressure generated. In practice the source 10 could be provided by an hydraulic master cylinder such as is provided in most conventional hydraulic braking systems.

The pressure in the conduit 14 is applied to an hydraulic distributor 20 which normally passes the fluid under pressure through a conduit 101 to a brake actuator 100 which cooperates with a brake drum or disc 102 mounted for rotation with a wheel (not shown) of the vehicle. The distributor 20 is operable to discharge the fluid under pressure from the conduit 101 to the reservoir 11 through a conduit 19 when it receives an electrical control signal from an anti-skid control arrangement 103 which is fed with a signal representing the instantaneous speed of the wheel from a tachometric device 104.

The anti-skid control device 103 may be of any suitable type which can operate to produce an electrical signal whenever the wheel with which the tachometric device 104 is associated is in a state of incipient locking; the criteria for detecting this state are well known in the art and will thus not be further described herein.

Figure 3:
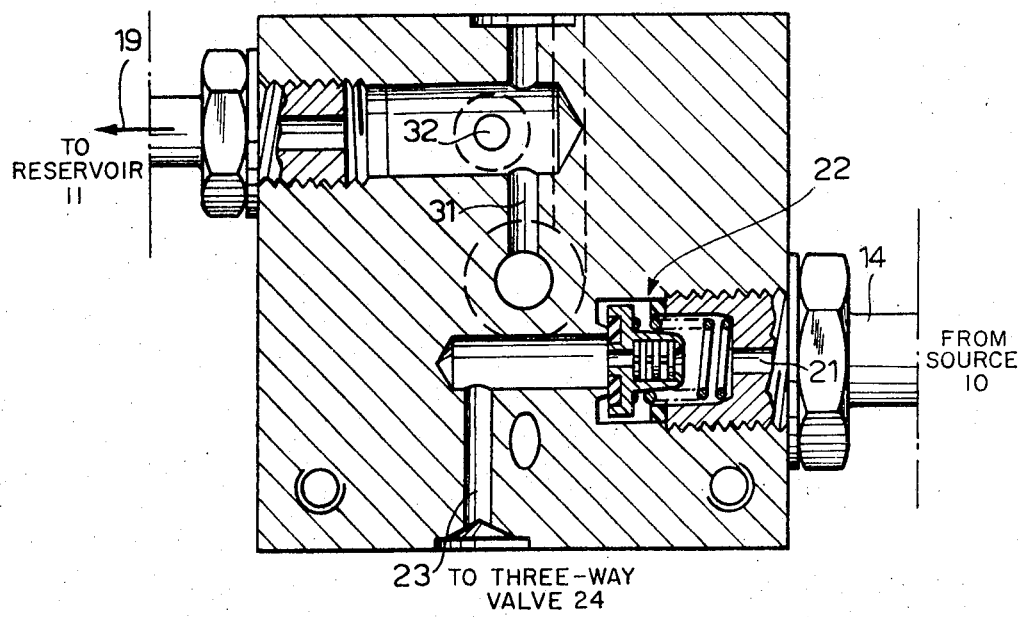
FIG. 3 is a cross section taken along the line III—III of FIG. 1 showing part of the embodiment of FIG. 1.

With reference to FIGS. 2 and 3 which illustrate in detail one embodiment of the distributor 20 of FIG. 1 in axial and transverse section respectively, the conduit 14 is connectable to an orifice 21 which is connected through a fixed throttle arrangement 22 to a passageway 23 which leads to one input port of a three port electrically operated valve 24; such valves will be referred to hereinafter as "electrovalves." The normal (deenergised) position of the electrovalve 24 is such as to connect the port 23 to an outlet port of the electrovalve, which is connectable to the conduit 101 leading to the brake actuator 100 so that the conduit 14 is normally connected to the brake actuator 100 as described in relation to FIG. 1.

The electrovalve 24 has two further inlet ports 24a and 25. The port 25 is normally closed and communicates through a passageway 26 with an upper chamber 37 of a cylinder 28. Within the cylinder 28 there is located a valve shutter 40 which is smaller in diameter than the cylinder thereby defining an annular passageway 29 between itself and the walls of the cylinder. The annular passageway 29 forms part of a path from the passageway 26 through an annular chamber 30 and a passageway 31 to a discharge passageway 32 which is connected to the reservoir 11 by the conduit 19.

The upper chamber 27 also communicates with an absorber device 34a which comprises a cushion 34 of a synthetic material containing a fluid of high compressibility, which may be, for example, the material sold under the trade name FREON 20, or nitrogen or other fluid of similar properties, through a perforated disc 27a. The cushion 34 is confined by a cover 34b which is sealed by a sealing ring 34c and held in position by an annular disc 34d held by bolts 34e. The chamber in which the cushion 34 is contained also communicates with the discharge passageway 32 through a passageway 35 containing a throttle 33 similar to the throttle 22.

In the normal position of the electrovalve 24, the passageway 23 which is connected to the brake actuator 100 also communicates with a passageway 37 which is connected through an orifice 38 to a cylinder 28 in which there is slidable a piston 39 one end 40a of which engages the valve shutter 40 which is urged against the end 40a by a weak spring 41. The spring 41 is compressed between the shutter 40 and the perforated disc 27a. The other end of the piston 39 has an enlarged head 42 which engages against the inside of the end of a sleeve 43, which has an annular radial flange 43a which is held against a wall 44 of the distributor by a strong calibrated spring 145. The spring 145 is compressed between the flange 43a and the bottom of a cup 146 which is bolted to the body of the distributor by bolts 147.

The fluid under pressure is free to flow from the passageway 37 through the orifice 38 into the cylinder 28 because the piston 39 in that part of the cylinder has a diameter which is less than that of the cylinder 28. Therefore the fluid under pressure can act upon the annular faces 39a of the enlarged head 42 of the piston 39.

A second electrovalve 45 normally connects the chamber 27 with the discharge passage 32 through conduits 46 and 47.

OPERATION

Normal braking, that is when the anti-skid control device 103 does not operate during the braking operation, causes an increase in pressure in conduit 14 due to the operation of the pressure sources 10, under the control of the pedal 16. The fluid thus enters the distributor 20 through the orifice 21 and the throttle 22 and is passed through the port 23 of the electrovalve 24 to the conduit 101 thereby causing a gradual pressure increase at the brake actuator 100. Contemporaneously, through the conduits 24a and 37, the fluid passes through the orifice 38 and acts on the annular face 39a of the head 42 of the piston 39. If the pressure of fluid on the face 39a (which is equal to the pressure applied to the brake actuator 100) remains below a threshold value determined by the calibration of the spring 45, the variation of the braking pressure will be that shown by the line AB of FIG. 4.

When the pedal 16 is released, the fluid returns from the brake actuator 100 through the conduit 101, electrovalve 24, passageway 23, throttle 22, orifice 21, conduit 14, back through the pressure source 10 and conduit 12 to the reservoir 11. The pressure thus reduces at a similar rate to that at which it increased when the brakes were applied, as shown by the line BC of FIG. 4.

If, during a braking operation, the pressure of fluid on the brake actuator 100 and hence also on the face 39a of the head 42 of the piston 39, exceeds the threshold value, indicated $p_o$, of the spring 145, which, for example, might be in the region of 25 atmospheres, the pressure of fluid on the head 42 will then thrust the piston 39 downwards (in the orientation shown in FIG. 2) against the resistance of the spring 145. This movement of the piston 39 effectively enlarges the capacity of the cylinder 28 so that it operates in part as an absorber cylinder. At the same time the movement of the piston 39 allows the valve shutter 40 to be moved by the spring 41 to close the annular chamber 31. Therefore, the braking pressure, after having increased in the same way as for normal braking up to pressure $p_o$ as shown by line DE of FIG. 4 subsequently increases at a slower rate above this pressure as shown by line EF in FIG. 4.

When the brake is released the brake fluid returns in the same way as described above and the pressure falls as shown by line FG of FIG. 4. When the pressure falls below the threshold $p_o$ of the spring 145, the force of the latter moves the piston 39 and the sheath 43 back to the original position.

When the anti-skid control device 103 operates during braking the distributor 20 operates in one of two different modes depending on whether or not the braking pressure is greater than the threshold $p_o$. The pressure $p_o$ is selected so that it is greater than the braking pressure normally required to cause the wheels of the vehicle to skid during braking over surfaces of poor adhesion such as wet or icy surfaces. This calibration must, of course, be determined for the type of vehicle to which the anti-skid arrangement is to be fitted.

If the braking pressure is below the threshold $p_o$ when the tachometric device 104 indicates a condition of imminent locking of the wheel the distributor operates as follows: the control device 103 feeds a signal to the solenoids of the valves 24, 45 which brings the two valves into their respective second position, the valve 24 moves to close the ports 23 and 24a and to connect the port 25 to the conduit 101 so that the fluid discharges from the brake actuator 100 through the electrovalve 24, the port 25, the passageway 26, the upper chamber 27, annular passage 29, the annular chamber 30, and the passageway 31 to the discharge passageway 32 and thence to the reservoir 11. The passage through the electrovalve 45 from the conduit 46 to the conduit 47 is in fact interrupted by the signal from the anti-skid control arrangement 103 but this does not affect the discharge of pressure in this case which thus takes place in direct manner as shown by the line LM of FIG. 5.

If locking of the wheel occurs during braking when the pressure on the brakes exceeds the calibration threshold $p_o$ of the spring 145 the distributor operates in a different mode as follows. As mentioned above the piston 39 is moved downwards when the pressure $p_o$ is exceeded and the valve shutter 40 closes the annular orifice 29.

When the anti-skid control device 103 operates the braking pressure is discharged into the chamber 27 but since direct communication to the discharge passageway 32 is now interrupted by the valve shutter 40 the fluid under pressure passes to the absorber device constituted by the cushion 34 and fills the chamber in which it is housed. This causes a rapid pressure drop of a given increment in the braking pressure. Following this the fluid under pressure discharges through the throttle 33 to the reservoir 11 via the passageway 32 as before.

The pressure thus falls as shown by the line QR of FIG. 5, until it reaches the threshold pressure $p_o$ corresponding to the calibration threshold of the spring 145; at this point the spring 145 extends, pushing the piston 39 upwards, so that the shutter 40 is reopened and direct communication between the chamber 27 and the discharge passageway 32 is resumed. From the point R of FIG. 5 the braking pressure again decreased extremely rapidly, as shown by the line RS.

It will be appreciated that, in both modes of operation, it will often happen, that discharge of the braking pressure by the anti-skid control arrangement will not continue as far as a complete release of the braking pressure as shown in the drawings, since when the wheel if no longer in danger of skidding the control signal to the electrovalves 24 and 25 will be removed and the initial conditions will be resumed. Thus it is possible for braking to be resumed at any time after the initial operation of the anti-skid arrangement.

In the second mode of operation, interuuption of the control signal by the anti-skid control arrangement reopening the valve 45, enables the fluid in the chamber 34a with the absorber cushion 34 to discharge through the perforated partition 27a the chamber 27, the conduit 46, valve 45, conduit 47 and the discharge passageway 32 to the reservoir 11.

We claim:

1. In an hydraulic distributor for an automobile antiskid braking system of the type comprising:
    source means of fluid under pressure,
    braking actuator means,
    reservoir means for said hydraulic fluid,
    means connecting said source means of fluid under pressure to said reservoir means and means connecting said braking actuator means to said source means of fluid under pressure, and
    anti-skid control means sensitive to the dynamic state of a wheel of said automobile and operative to provide a control signal when said wheel is in an incipient locking condition, said hydraulic distributor having,
    means defining an inlet orifice connectable to said source means of hydraulic pressure,
    means defining an outlet orifice connectable to said braking actuator means,
    means defining a discharge orifice connectable to said reservoir means, and
    a control input connectable to said anti-skid control means, the improvement wherein:
    a. said distributor comprises means defining a cylinder in said distributor,
    b. a piston in said cylinder,
    c. a calibrated spring biasing said piston to a first position thereof, said cylinder being open to said hydraulic braking fluid whereby said piston is moved to a second position thereof when the pressure in said hydraulic braking fluid exceeds the calibration threshold of said biasing spring,
    d. a chamber communicating with said discharge orifice through first communication means,
    e. a valve shutter in said chamber,
    f. biasing means biasing said valve shutter to a closed position where it closes said first communication means between said chamber and said discharge orifice when said piston is in said second position, said piston moving said valve shutter to an open position thereof when said piston is in said first position to open said first communication means,
    g. first valve means connecting said inlet orifice to said outlet orifice,
    h. solenoid means controlling said valve means, said solenoid means being connected to said control input of said distributor whereby said solenoid receives signals from said anti-skid control device when said distributor is connected in an anti-skid braking system, said solenoid operating to close said communication between said inlet orifice and said outlet orifice and to establish communication between said outlet orifice and said chamber when energised by a control signal from said anti-skid control means,
    i. absorber means communicating with said chamber, means defining a first throttle between said absorber means and said discharge orifice, and
    j. second communication means between said chamber and said discharge orifice, said second communication means including second solenoid operated valve means connected to said control input of said distributor, said second valve means being open when said solenoid is deenergised and closing when said solenoid is energised, to close said second communication means between said chamber and said discharge orifice.

2. The hydraulic distributor of claim 1 wherein there are means defining a second throttle means between said inlet orifice and said first valve means.

3. The hydraulic distributor of claim 1 wherein said absorber means comprises a chamber enclosing a cushion filled with a compressible fluid.

4. The hydraulic distributor of claim 1 wherein said piston is arranged such that it enlarges said cylinder when moving from its first position to its second position whereby said cylinder operates as an absorber when said braking pressure reaches said calibration threshold of said calibrated spring.

* * * * *